United States Patent
Bach et al.

(10) Patent No.: US 9,267,700 B2
(45) Date of Patent: Feb. 23, 2016

(54) APPLIANCE AIRFLOW DETECTION USING DIFFERENTIAL PRESSURE SENSING

(75) Inventors: James Carter Bach, Seymour, IN (US); Paul E. Newsom, Louisville, KY (US)

(73) Assignee: General Electric Company, Schenectady, NY (US)

( * ) Notice: Subject to any disclaimer, the term of this patent is extended or adjusted under 35 U.S.C. 154(b) by 751 days.

(21) Appl. No.: 13/198,037

(22) Filed: Aug. 4, 2011

(65) Prior Publication Data

US 2013/0035030 A1    Feb. 7, 2013

(51) Int. Cl.
*F24F 11/00*     (2006.01)
*F24C 15/00*     (2006.01)

(52) U.S. Cl.
CPC ............. *F24F 11/00* (2013.01); *F24C 15/006* (2013.01)

(58) Field of Classification Search
CPC ............. F24F 11/00; F24F 2011/0002; F24F 2011/0038; F24F 2011/0042; F24F 2011/0064; F24F 2011/0091; F24C 15/002; F24C 15/006; F24C 15/2007; F24C 15/2021; F24C 15/322
USPC .................. 454/255, 256, 306, 324
See application file for complete search history.

(56) References Cited

U.S. PATENT DOCUMENTS

| | | | |
|---|---|---|---|
| 3,553,403 A | 1/1971 | Porwancher | |
| 4,392,038 A * | 7/1983 | Day et al. ..................... | 219/738 |
| 4,481,828 A * | 11/1984 | Cheng ......................... | 73/861.63 |
| 6,287,108 B1 | 9/2001 | Rothenberger et al. | |
| 6,308,694 B1 * | 10/2001 | Kotwicki et al. ......... | 123/568.16 |
| 7,730,793 B2 | 6/2010 | Speldrich | |
| 2009/0241943 A1 | 10/2009 | Schwank et al. | |

* cited by examiner

*Primary Examiner* — Gregory Huson
*Assistant Examiner* — Dana Tighe
(74) *Attorney, Agent, or Firm* — Dority & Manning, P.A.

(57) ABSTRACT

A device for detecting and/or measuring air flow in a cooling air flow passageway of an appliance using solid-state flow detectors. Heat generating components of the appliance are controlled in response to detected air flow. More specifically, the disclosure provides a device for detecting the presence of airflow and/or the approximate rate of airflow in a cooling channel of an appliance chassis. Based on this information, the appliance can perform safety-related tasks, such as de-energizing associated heating elements if there is too-low (or no) airflow detected. The solid-state flow detectors are easily fabricated, installed, and calibrated and avoids the calibration, fabrication and/or installation difficulties associated with sail switches and other such approaches such as thermal limit switches.

17 Claims, 6 Drawing Sheets

APPLIANCE AIRFLOW DETECTION USING DIFFERENTIAL PRESSURE SENSING

BACKGROUND OF THE DISCLOSURE

The present disclosure generally relates to appliances, and more particularly, to detecting airflow, and/or measuring airflow velocity, in a cooling pathway of an appliance.

Appliances such as cooking ranges are widely used. A cooking range typically includes an oven. The oven typically has a front-opening access door, and at least one heating element for heating up the inside of the oven cavity. As is known in the art, when energized, the heating element can heat up the inside of the oven cavity to a relatively high cooking temperature chosen by a user. Also as is known in the art, the cooking range often has a fan which is used to cool a component of the oven, such as the front-opening access door, or a heat sensitive component of the oven such as an electrical element (e.g., electronic controller, display unit, etc.), to a temperature which is lower than the chosen cooking temperature. Some certification institutions, such as Underwriters Laboratories Inc. (UL), require that a Fan Apparency Device (FAD) be employed in the cooking range. The FAD is used to determine or detect whether the fan is working properly, that is, whether or not airflow is being created by the cooling fan.

As is known in the art, when a user selects or chooses a heating operation of the oven and turns on the oven, the turning-on supposedly activates the fan. The FAD then determines or detects whether the fan is working properly. If the fan is working properly, the FAD enables the selected heating operation of the oven to proceed. On the other hand, if the fan is not working properly, the FAD prevents the selected heating operation of the oven from proceeding. Various types of FADs are used to determine or detect whether the fan is working properly.

The most widely used FADs are thermal switches and sail switches. A thermal switch uses the heat from the oven to heat up a bimetal member of the switch to turn off the switch when the airflow from the fan is no longer present to cool off the bimetal member. Since the thermal switch usually is not disposed adjacent the intake end or the discharge end of the fan, it does not negatively affect the airflow passing through the fan. However, the thermal switch has a relatively slow reaction time. In addition, the thermal switch needs to be installed in an area of the oven where the temperature can raise quickly when the oven is turned on. Moreover, the thermal switch requires a significant amount of calibration and testing to prove that it will work as intended in all working conditions of the oven.

A typical sail switch uses the airflow generated by the fan to move a sail, typically a large, flat piece of sheet metal, to turn on or off the switch, Sail switches often include a spring return for returning the sail. Compared with the thermal switch, the sail switch has a very fast reaction time, and requires significantly less time/effort to implement. However, the sail switch has its own limitations. In particular, when it is desirable to direct or point the exhaust end or discharge end of the fan toward the floor on which the appliance is placed, it can be difficult to satisfactorily employ the sail switch in this configuration. This is because in this configuration, the positive pressure side of the sail, which is positioned downstream of the fan, has to face up. As a result, the weight of the sail constantly urges the sail to move from its upper position where the sail opens the switch to its lower position where the sail closes the switch. To make matters worse, in this configuration the positive pressure side of the sail tends to collect a noticeable amount of dust particulates, grease, etc. All of these contribute to the problem that the sail may move to and stay in its lower position even when the fan is not activated, thus creating a false indication of the working condition of the fan. Sail switches also tend to be constructed of thin, flimsy metal and are easily damaged or knocked out of calibration during repair operations and abusive shipping disturbances (drops). Sail switches have also been prone to producing rattling/chattering noises, thus disturbing/annoying the operator of the appliance (also known as the consumer).

SUMMARY OF THE DISCLOSURE

The present disclosure provides for detecting air flow in a cooling air flow passageway of an appliance using solid-state flow detectors and controlling heat generating components of an appliance in response to detected air flow. More specifically, the disclosure provides a method and device for detecting the presence of airflow and/or the approximate rate of airflow in a cooling channel of an appliance chassis. Based on this information, the appliance can perform safety-related tasks, such as de-energizing associated heating elements if there is too-low (or no) airflow detected. The disclosure provides a solid state flow detector that is easily installed and calibrated and avoids the calibration, fabrication and/or installation difficulties associated with prior art approaches.

In accordance with one aspect, an appliance comprises a chassis, a blower, an air passageway for circulating air from the blower within and/or around at least a part of the chassis, and an air flow measuring device supported within the air passageway for measuring a rate of flow of air flowing through the air passageway, wherein the air flow measuring device includes a differential pressure unit, and a controller that monitors the air flow measuring device to calculate the air flow rate within the air passageway and which performs certain actions based on the measured air flow rate. In one embodiment, the air flow measuring device includes a differential pressure unit and a comparator for calculating flow rate based on the sensed pressures. The differential pressure unit can include a venturi and at least one pressure sensor for measuring pressure differential between a first location of the venturi having a first cross-sectional area and a second location of the venturi having a second cross-sectional area. The venturi can include an outer cylindrical housing, a radially inner wall of the housing forming a flow passageway having a constriction. In another embodiment, the differential pressure unit includes a pressure cup having an opening positionable within the passageway orthogonal to a direction of flow, a first pressure sensor for sensing pressure at a location within the pressure cup, and a second pressure sensor for sensing static pressure immediately downstream of the pressure cup.

A controller can be adapted to receive input from the comparator and, in response thereto, control the heat source. The appliance can further include a relay for controlling power supplied to the heat source, and the flow measuring device can be configured to open the relay when a flow of air through the passageway is less than a threshold value. The air flow measuring device can be installed as a unit in the appliance. The comparator can include an analog comparator circuit (including, for example, any of an operational amplifier, an instrumentation amplifier, a multiplier, a subtractor, a comparator, a square-root amplifier, a logarithmic amplifier, etc.), and/or a digital microprocessor (including, for example, a circuit comprising a microprocessor with analog-to-digital (aka ADC) conversion ports and software to perform needed calculations).

In accordance with another aspect, an airflow detection module for detecting airflow in a passageway of an appliance comprises a differential pressure unit for measuring pressure in two locations, and a comparator for calculating flow rate based on the sensed pressures, wherein the module is installable as a unit in an appliance. In one embodiment the differential pressure sensor unit includes a venturi and at least one pressure sensor for measuring differential pressure between a first location of the venturi having a first cross-sectional area, and a second location of the venturi having a second cross-sectional area. The venturi can include an outer cylindrical housing, a radially inner wall of the housing forming a flow passageway having a constriction. In another embodiment, the differential pressure sensor unit includes a pressure cup having an opening positionable within the passageway orthogonal to a direction of flow, a first pressure sensor for sensing pressure at a location within the pressure cup, and a second pressure sensor for sensing static pressure immediately downstream of the pressure cup. The comparator can include an analog comparator circuit and/or a digital microprocessor.

In accordance with another aspect, a method of controlling a heat source of an appliance comprises providing a differential pressure sensor in a cooling passageway of the appliance, sensing a flow condition in the cooling passageway based on an observed pressure differential, and controlling the heat source when the sensed flow condition is below a threshold value. In one embodiment, controlling includes deactivating the heat source. The deactivating can include communicating a signal to a main controller operatively connected to the heat source for controlling operation thereof, the signal commanding the main controller to deactivate the heat source. In another embodiment, the deactivating includes opening a relay switch to disconnect a power supply operatively connected to the heat source. The heat source can be any heat generating component, such as an electrical component.

DETAILED DESCRIPTION OF THE PREFERRED EMBODIMENTS

Figure 1:
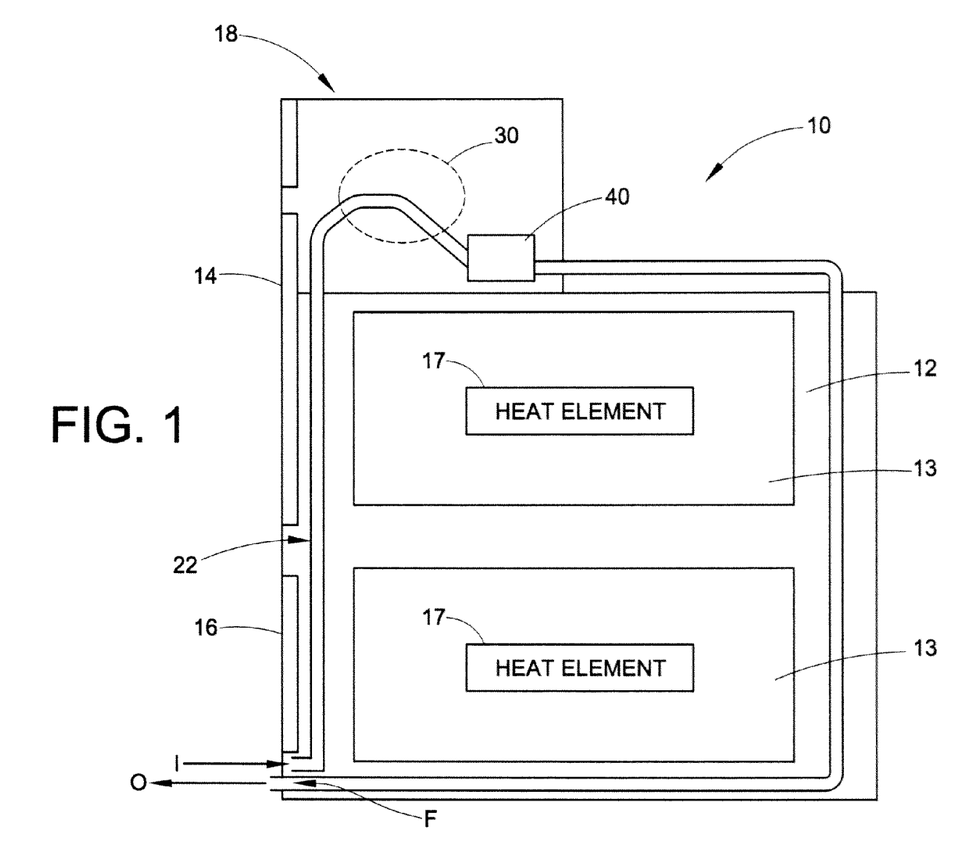
FIG. 1 is a side view of an exemplary appliance in the form of a double wall oven.

Turning now to the drawings, and initially to FIG. 1, an exemplary double wall oven 10 is illustrated. The double wall oven 10 generally includes an outer housing 12 defining an interior space 13 in which food or other items to be heated can be placed, and upper and lower doors 14 and 16 for providing access to respective portions of said interior space 13 inside of which one or more heating elements 17 are located. An electronics bay 18 is positioned on an upper side of the oven 10 and contains various electronic controls for controlling operation of the oven 10. It will be appreciated that the features of the present disclosure can be implemented in a wide variety of appliances and, thus, the specific type of oven or appliance is merely exemplary. Accordingly, only the basic features of the oven 10 are described.

As is conventional, the oven 10 includes one or more cooling air-flow passageways 22 for circulating air around the oven chassis and the electronics bay 18. The passageway 22 generally defines a flowpath F for the flow of air from an inlet I near the bottom front of the oven 10, up the front and through the electronics bay 18, including the blower 30 which in this embodiment creates the air flow through the passageway, and then down the rear of the oven 10 and forward to an outlet O. It will be appreciated that a variety of different air flow passageway topologies could be implemented in an oven, and the exemplary passageway is but one example.

Figure 2:
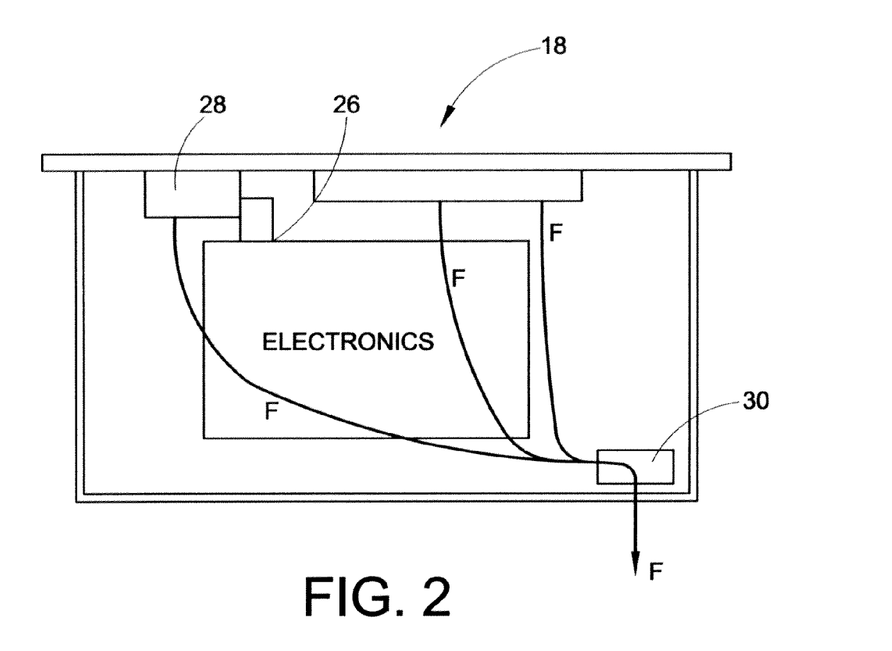
FIG. 2 is a top view of an electronics bay of the oven of FIG. 1.

With reference to FIG. 2, the interior of the electronics hay 18 is illustrated. As mentioned, the electronics bay 18 includes electronic controls 26 (e.g., a main PCB) for controlling the operation of the oven 10. A user interface 28 is provided on a front surface of the electronics hay 18 for allowing a user to control the operation of the oven. The user interface can include one or more buttons and/or a display for displaying information such as set temperature, timer information, etc.

Supported within the electronics bay 18 are one or more electric blowers 30 for providing positive ventilation to the electronics bay 18 and/or circulating air around the oven chassis and/or housing 12 (FIG. 1). These blowers 30 are activated during operation of the oven 10 to circulate air through the flow passageway 22 for cooling the oven chassis and/or electronics bay 18. As will be appreciated, in the illustrated embodiment, the blowers 30 are configured to draw air across the electronic controls 26 and exhaust air to the rear of the electronic module 18. Referring back to FIG. 1, the flowpath F of air through the oven 10 can be seen as air is drawn in the inlet I and circulated through the electronics bay 18 and then exhausted via outlet O. In some double ovens, more than one blower 30 may be provided (e.g., one blower for the upper oven and one blower for the lower oven). Again, the illustrated oven 10 and/or configuration thereof is exemplary, and thus other appliances and/or configurations thereof can be used in accordance with the disclosure.

In a conventional appliance, a sail switch or other device would typically be located in the flow path F near the exhaust of the blower. When the blower is activated, the sail switch would be urged to a closed position and allow the heating elements to operate as along as adequate air flow maintained the sail switch in the closed position. If air flow were to decrease to a certain level, the sail switch would return to its open position thereby disabling the heating elements. As noted, sail switches (as well as other prior art approaches) are difficult to calibrate and can be unreliable.

In accordance with the present disclosure, a Venturi-Based Solid-State Flow Detector (VBSSFD) is supported within the post blower area (downstream of the blower's exhaust port) towards the rear of the oven, for detecting flow of air therethrough. The VBSSFD 40 is illustrated schematically in FIG. 3 and includes a venturi 42, a differential pressure sensor unit 43 including first pressure port P1 for sensing pressure at an inlet to the venturi 42 and a second pressure port P2 for sensing pressure at a reduced diameter section (restriction) of the venturi 42, and a circuit board 44 for processing information received from the pressure sensors P1 and P2 to determine the flow rate of air. It will be appreciated that instead of a differential pressure sensor (with 2 pressure ports) one could also use two single-ended (1-port, either gage or absolute) pressure sensors and electronically subtract their outputs to create a difference signal. The circuit board 44 may include one or more processors adapted to calculate airflow velocity and/or volumetric flow rate based on the sensed pressure differential between the pressure ports P1 and P2 and/or an analog calculation circuit for performing the same function. In the illustrated embodiment, the main PCB 46 is connected to the circuit board 44 and configured to deactivate the heating element 17 when insufficient air flow is detected. It will be appreciated that the functionality of the circuit board 44 can be up-integrated into the main PCB 46, rather than having two separate circuit boards. Alternatively, circuit board 44 could operate a relay (or other power switching device) placed between the main PCB 46 and the heating element 17 so as to disrupt activation of the heating element when the circuit board 44 deems that insufficient airflow is present (as will be illustrated in FIG. 6). Other switching mechanisms can be associated with the circuit board 44 for switching on or off various components of the oven based on detected air flow or lack thereof, such as lamps, buzzers, or other "user alert" indicators The basic operation of the VBSSFD 40 is based on the concept of a "Venturi Meter" (or "Venturi Anemometer"), wherein the pressure differential generated within the venturi is directly proportional to the rate of airflow through the venturi 42. In the present disclosure, an electronic differential pressure sensor unit 43 is employed to measure the pressure difference between the entrance (large cross-sectional area) and the constriction (small cross-sectional area) of the venturi 42. The voltage of the differential pressure sensor unit 43 increases as the square of the airflow rate through the venturi 42. This voltage is then measured and used to calculate the airflow rate of the airstream in which the venturi is immersed, in this case the flow passageway 12. An analog comparator circuit, or a digital microprocessor/microcontroller, is then used to determine if the airflow rate is insufficient and thus take remedial action, if necessary (such as turning-off the oven's heating elements, for example).

Figure 3:
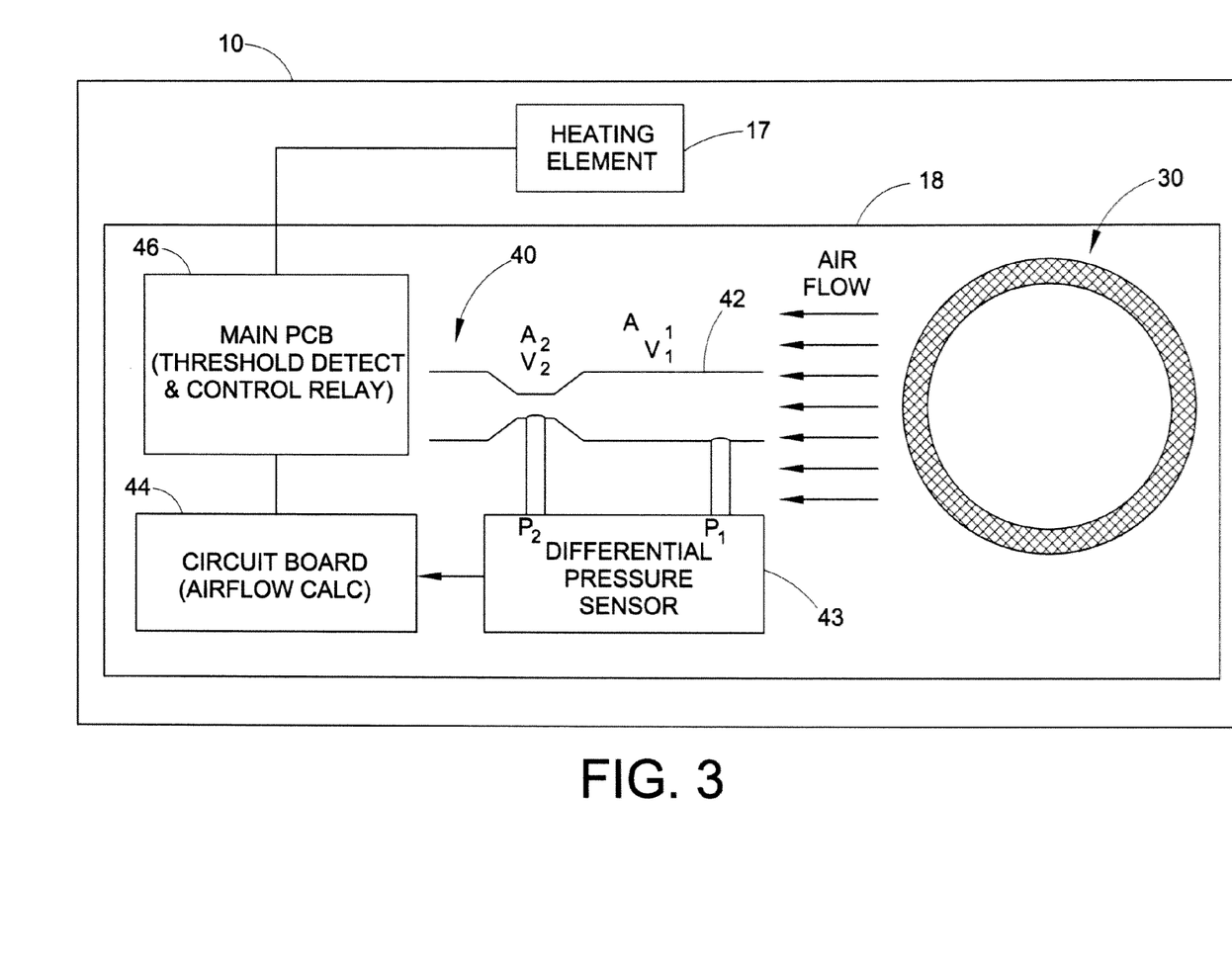
FIG. 3 is a schematic illustration of a venturi-based solid-state flow detector in accordance with an aspect of the disclosure.

As will be appreciated, flow velocity can be calculated using the equation derived from Bernoulli's principle and the continuity equation:

$$v_1 = \sqrt{\frac{2 \cdot A_2^2 \cdot (p_1 - p_2)}{A_1^2 \cdot \rho - A_2^2}}$$

wherein p1 and p2 are pressures at different locations in the venturi, and A1 and A2 are cross-sectional areas of the venturi at the respective location in the venturi where the pressures are measured.

Figures 4, 5:
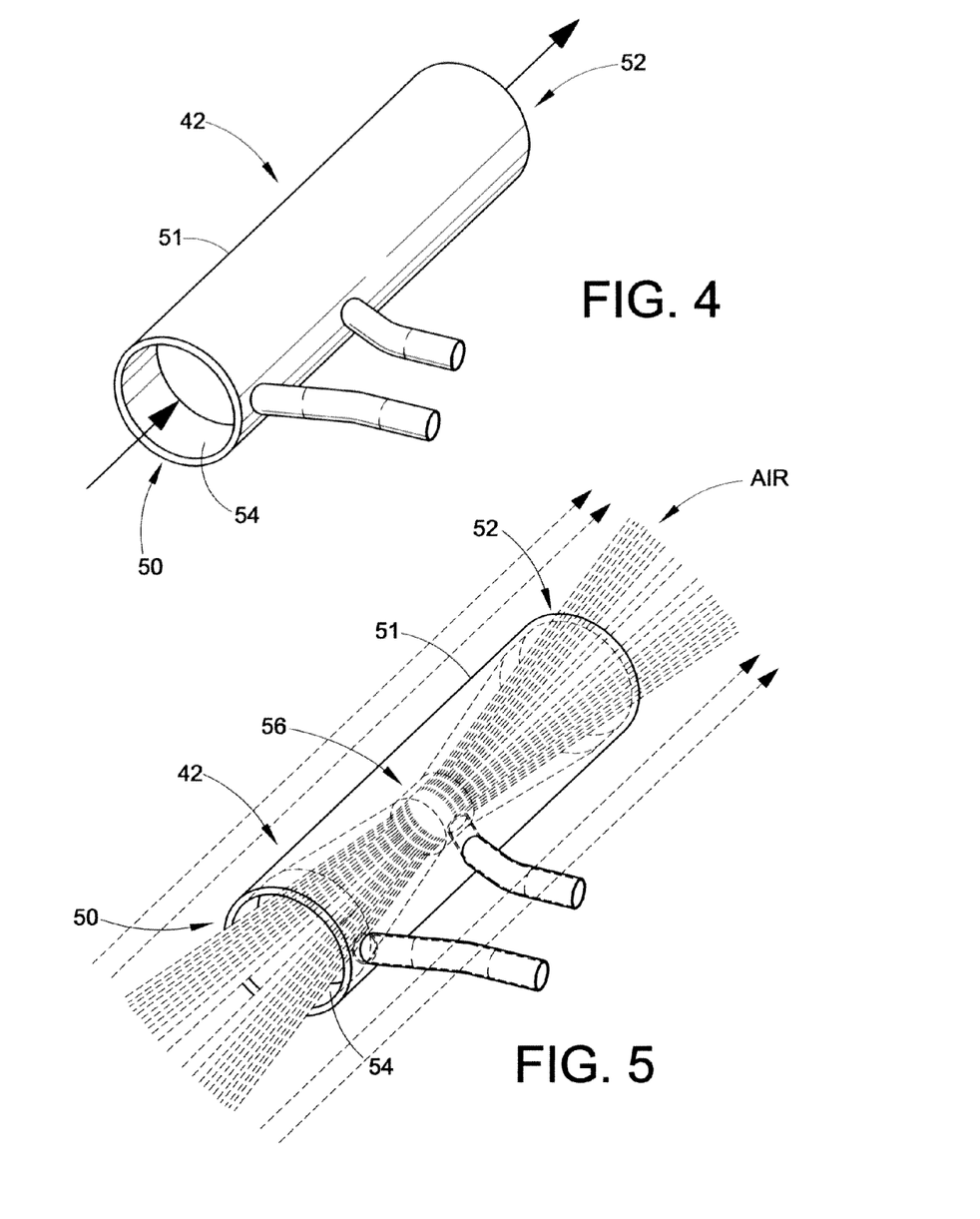
FIG. 4 is a perspective view of an exemplary venturi in accordance with the disclosure.
FIG. 5 is another view of the venturi of FIG. 4, illustrating fluid (air) flow through the same.

Turning to FIGS. 4 and 5, the details of the venturi 42 are shown. The venturi 42 has a generally cylindrical body 51 having an inlet 50 and an outlet 52. Air is designed to flow from the inlet 50 to the outlet 52 through a central bore 54 that extends through the length of the body 51. The central bore varies in diameter and is greatest at the axially outer ends of the body near the inlet 50 and outlet 52. A constriction 56 (FIG. 5) is defined by a reduced cross-sectional area in the bore 54 defined by a radially inner wall of the generally cylindrical outer housing of the venturi 42. It will be appreciated that while venturis are generally created in a cylindrical shape, there is no requirement for them to be made as such; any generally-linear flow path with any variable-area cross-sectional geometry may be used, such as ovals, ellipses, and polygons.

Given the relatively small size of the VBSSFD 40, it is easily implemented within an oven's cooling airflow path, such as the oven 10 in FIG. 1. Moreover, the modular nature of the VBSSFD 40 allows its installation in a wide variety of locations within a given appliance, and easy installation in a wide variety of appliances as well. The design also lends itself to either an "analog" solution (discrete op-amps and comparators) or by means of a "digital" solution (microprocessor/microcontroller).

Figure 6:
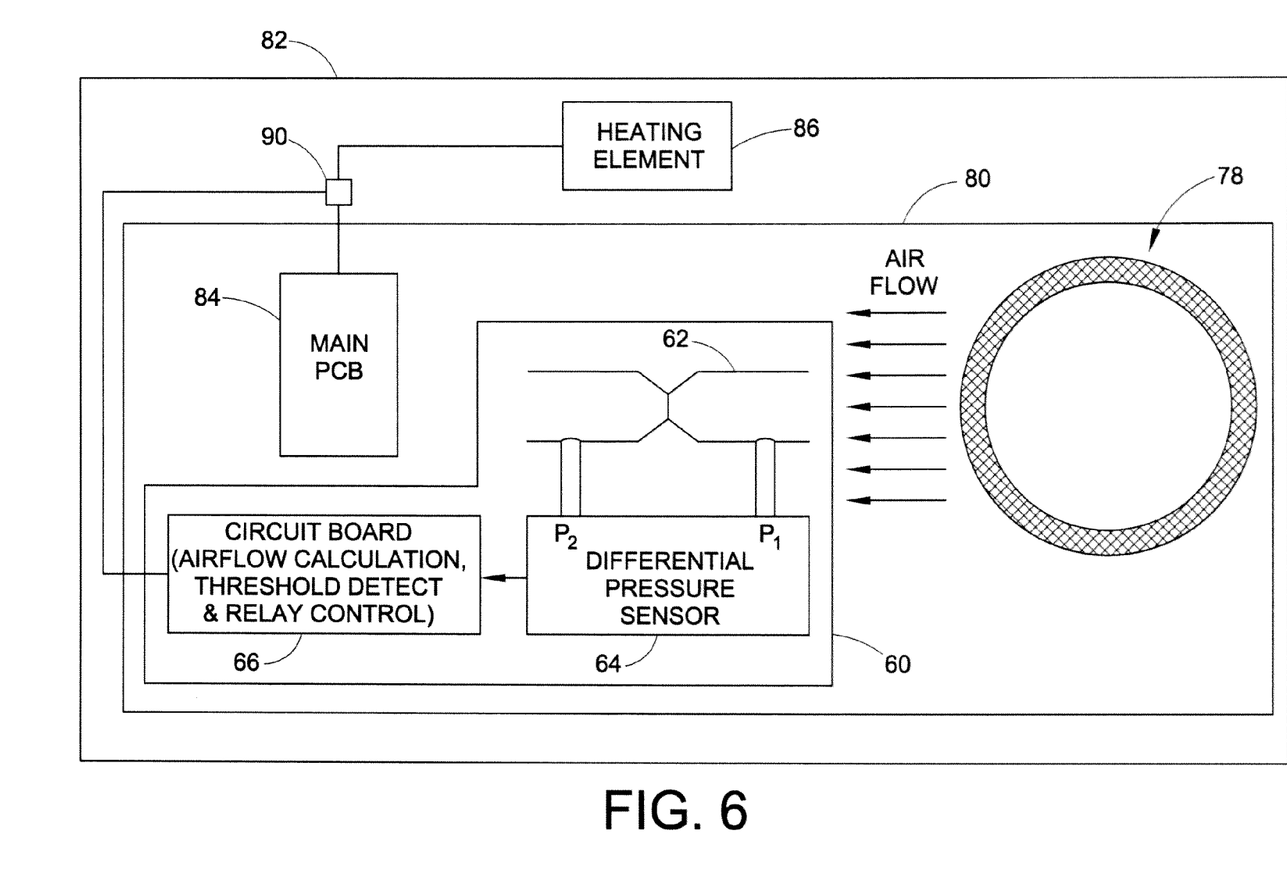
FIG. 6 is a schematic illustration of another exemplary flow detector in accordance with the disclosure.

Turning now to FIG. 6, another exemplary solid-state flow detector 60 is illustrated that can be supported within the electronics bay 80 of an appliance 82 in the same manner as VBSSFD 40 described above to detect air flow generated by a blower 78. The solid-state flow detector 60 is illustrated schematically in FIG. 6 and includes a pressure cup 62, a differential pressure sensor unit 64 including first pressure port P1 for sensing pressure within the pressure cup 62 and a second pressure port P2 for sensing ambient pressure outside of the pitot tube 62, for example directly downstream from (i.e. behind) the pressure cup 62, and a circuit board 66 for processing information received from the pressure ports P1 and P2 to determine flow rate of air. The circuit board 66 may include one or more processors adapted to calculate airflow velocity and/or volumetric flow rate based on the sensed pressure differential between the pressure ports P1 and P2. A main PCB 84 controls heating element 86 in response to user input (e.g., bake, 350 degrees) to regulate a cooking compartment (in the case of an oven).

In contrast to the previous embodiment shown in FIG. 3, the circuit board 66 of this flow detector 60 communicates a signal to a relay switch 90 (or some other power switching device) rather than the main PCB 84. The relay switch 90 is configured to interrupt the power provided to the heating element 86 when insufficient air flow is detected. In other words, the solid-state flow detector 60 can operate to detect a deficient air flow condition and, in response thereto, deactivate the heating element 86 regardless of the commanded state by the main PCB 84. In this configuration, the solid-state flow detector 60 functions completely independent from the main heating element control.

It will be appreciated, however, that the solid-state flow detector 60 could be configured to communicate with the main PCB 84 in the manner shown in the embodiment of FIG. 3. The communication between the flow detector 60 and the main PCB 84 can be any variety of electronic/electrical signals, including, but not limited to, a discrete on/off (i.e. binary) signal, or a serial data (aka packet) messaging scheme such as SCI, SPI, CAN, LIN, etc. Likewise, the VBSSD 40 could be configured to operate in conjunction with a relay to deactivate a heat source in the manner shown in FIG. 6.

The basic operation of this embodiment (FIG. 6) is similar to the concept of a "Pitot Tube", wherein the pressure generated at a static surface (and obstruction) is proportional to the rate of airflow past the obstruction. In this embodiment, an electronic differential pressure sensor 64 is employed to measure the pressure difference between the front and back ends of a pressure cup (in one embodiment, essentially a short, plugged-off venturi) 62 placed within the airflow path. The voltage of the differential pressure sensor 64 increases with the airflow rate past the pressure cup 62. This voltage is measured and used to calculate the airflow rate of the airstream in which the pressure cup 62 is immersed. An analog comparator circuit, or a digital microprocessor/microcontroller, is then used to determine if the airflow rate is insufficient and whether to take remedial action (such as turning-off the oven's heating elements).

Unlike prior art pitot tube arrangements wherein the "Low Pressure" is simply a measurement of "ambient" pressure taken from a port placed in a surface which is parallel with the airflow, in the present embodiment the pressure differential is amplified by placing the low pressure port on the low-pressure side (back-end) of the pressure cup 62. This location is in partial vacuum, as is the zone immediately behind a semi-truck or race car (e.g. the "Drafting" zone). Thus, as the airflow increases, not only does the pressure rise within the pressure cup 62, but also so does the vacuum (negative pressure) behind the pressure cup 62. This provides a greater "signal" (larger pressure differential) for the sensor to measure, thus allowing the use of less-sensitive (and typical less expensive) pressure sensors.

Figure 7:
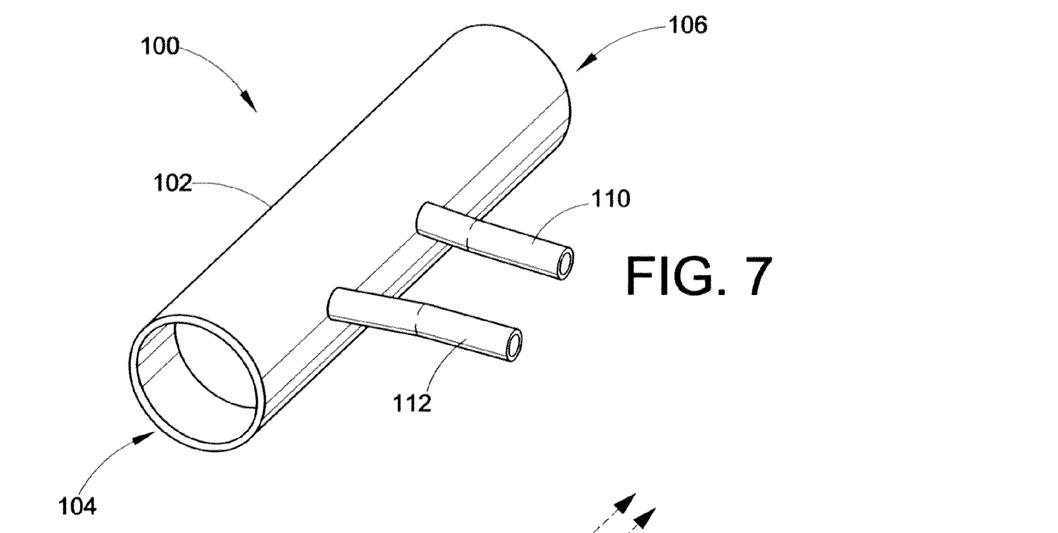
FIG. 7 is a perspective view of an exemplary pressure cup flow detector in accordance with the disclosure.
Figure 8:
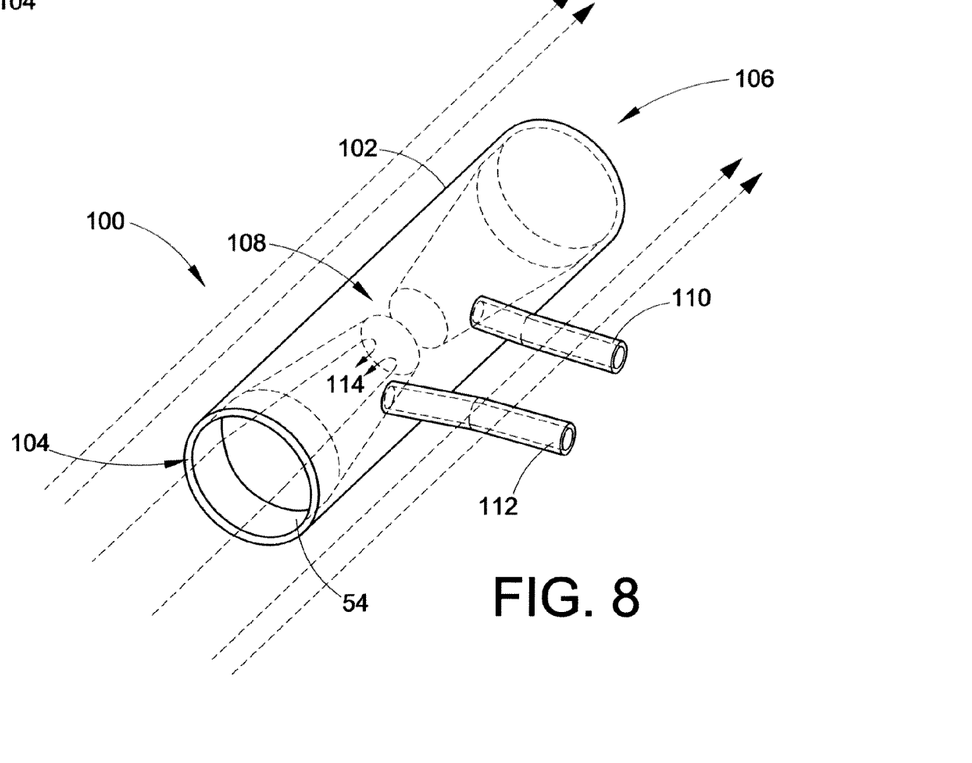
FIG. 8 is another view of the pressure cup flow detector of FIG. 7, illustrating fluid (air) flow around the same.

Turning to FIGS. 7 and 8, an exemplary pressure cup flow detector is generally identified by reference numeral 100. The pressure cup flow detector includes an elongated cylindrical body 102 having an upstream cavity 104 and a downstream cavity 106 in each end. The cavities 104 and 106 are blind and are not in fluid communication with each other. To this end, a central portion 108 of the body 102 physically separates the cavities 104 and 106. Pressure ports 110 and 112 provide access to the axially inner end of each cavity 102 and 104 for measuring/detecting pressure.

When the pressure cup 100 is placed in a flowpath of air, or any other fluid) the air pressure in the upstream cavity 104 increases while the air pressure in the downstream cavity 106 decreases. To this end, it should be appreciated that fluid dead ends, or stagnates, at 114 as it cannot flow through the cup but must flow around the cup. Accordingly, the difference in pressure between the upstream cavity 104 and the downstream cavity is greater than simply measuring pressure in the upstream cavity 102 and at a location within the flowpath, as would be the case for a pitot tube or the like. The increased pressure differential can make it easier to measure small flow rates, and/or can allow the use of less sensitive, and therefore less expensive, hardware for measuring the pressure differential while maintaining performance.

This disclosure thus provides a more robust manner with which to detect airflow within, for example, an oven's cooling path. It measures airflow directly, like a "Sail Switch", but using solid-state technology. Unlike "thermal switches" this disclosed airflow detectors are "resettable" (i.e. sensing a stalled-fan condition is non-destructive to the sensing system).

Being based on solid-state devices (i.e. no moving parts) this design is more robust than the commonly-used "Sail Switch" for measuring airflow and determining its sufficiency. Since it is directly measuring the airflow in the cooling path of the appliance, it is more robust than schemes which simply measure the RPM of the fan impeller (RPM is not a 100% sure indication of actual air flow).

Moreover, the present disclosure provides air flow detection devices and methods that can be immersed in a flowpath of liquid to detect flow within a conduit or the like. Unlike prior art systems, the present disclosure only needs to be exposed to a portion of the flowpath and does not need to be exposed to the entire flow stream, such as a sail switch or the like.

It will be appreciated that aspects of the disclosure are applicable to a wide variety of appliances. Although the illustrated embodiments are directed to ovens, aspects of the disclosure are applicable to other appliances such as refrigerators, washers, dryers, hot water heaters, air conditioners etc. Thus, it will be appreciated that, depending on the appliance, a heat source can comprise a wide variety of heat producing components including a circuit board, a magnetron, a light, resistive and inductive heating elements, a gas burner, a combustion engine, etc.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An appliance comprising:
   a chassis and an internal housing including an electronics bay, said electronics bay containing electrical components;
   a blower;
   an air passageway for circulating air drawn from outside the appliance through the blower from the blower within and/or around at least one surface of the chassis and through the electronics bay;
   an air flow measuring device including a differential pressure unit, the air flow measuring device for measuring a rate of flow of air flowing through the air passageway, the air flow measuring device supported within the air passageway such that air flowing in the passageway flows against and around, but not through, the air flow measuring device;
   and
   a controller that monitors the air flow measuring device to calculate the air flow rate within the air passageway and which performs certain actions based on the measured air flow rate,
   wherein the differential pressure unit includes a double-cup flow detector having a first opening positioned within the air passageway essentially facing a direction of air flow through the passageway, a second opening opposite the first opening within the air passageway essentially facing away from the direction of air flow, and at least one pressure sensor for measuring the differential pressure between a stagnant pressure at a location within the first opening and a static pressure at a location within the second opening, and
   wherein a first cavity is defined at least in part by the first opening, a second cavity is defined at least in part by the second opening, and a solid partition physically separates the first cavity from the second cavity.

2. An appliance as set forth in claim 1, wherein the air flow measuring device is installed as a unit within the appliance.

3. An appliance as set forth in claim 1, further comprising: a heat source wherein the controller interprets the differential pressure measured by the air flow measuring device so as to determine air flow rate within the air flow passageway and at least one of permits or restricts operation of the heat source based on whether the air flow rate is above or below a prescribed threshold.

4. An appliance as set forth in claim 1, wherein the controller determines an airflow rate with an analog circuit or with a digital circuit.

5. An appliance as set forth in claim 1, wherein the differential pressure unit includes a single-cup flow detector having an opening positionable within the air passageway essentially facing a direction of air flow through the passageway, and at least one pressure sensor for measuring the differential pressure between the stagnant pressure at a location within the single-cup flow detector and the static pressure outside of the single-cup flow detector.

6. An air flow measuring device for detecting air flow in a passageway of an associated appliance comprising: a differential pressure unit for measuring pressure in two locations; and circuitry for calculating air flow rate based on the sensed pressure differential; wherein the air flow measuring device is installable as a unit within the passageway of the associated appliance such that air flows against and around the air flow measuring device, wherein the differential pressure sensor unit includes a double-cup flow detector having a first opening positioned within the passageway orthogonal to facing a direction of flow, and a pressure sensor for measuring the differential pressure between a stagnant pressure at a location within the first opening and a static pressure at a location within a second opening, and wherein a first cavity is defined at least in part by the first opening, a second cavity is defined at least in part by the second opening, and a solid partition physically separates the first cavity from the second cavity.

7. An air flow measuring device as set forth in claim 6, wherein the circuitry includes an analog circuit.

8. An air flow measuring device as set forth in claim 6, wherein the circuitry includes a digital circuit.

9. An air flow measuring device as set forth in claim 8, wherein the digital circuit further comprises any combination of discrete logic and/or microprocessor executing software.

10. An air flow measuring device as set forth in claim 6, wherein the differential pressure unit includes a single-cup flow detector having an opening positionable within the air passageway essentially facing a direction of air flow through the passageway, and at least one pressure sensor for measuring the differential pressure between the stagnant pressure at a location within the single-cup flow detector and the static pressure outside of the single-cup flow detector.

11. An air flow measuring device for detecting air flow in an air passageway of an associated appliance comprising: a differential pressure unit for measuring pressure in two locations; and circuitry for calculating air flow rate based on the sensed pressure differential; wherein the air flow measuring device is installable as a unit within the air passageway of the associated appliance such that air flows against and around the air flow measuring device, wherein the differential pressure sensor unit includes a single-cup flow detector having an opening positionable within the air passageway essentially facing a direction of air flow through the passageway, and at least one pressure sensor for measuring the differential pressure between a stagnant pressure at a location within the single-cup flow detector and a static pressure outside of the single-cup flow detector.

12. The air flow measuring device of claim 11, wherein the a downstream pressure sensor is positioned directly downstream of the single-cup flow detector opposite the opening of the single-cup flow detector.

13. The air flow measuring device of claim 12, wherein the single-cup flow detector defines a cavity, and a solid partition physically separates the cavity from the downstream pressure sensor.

14. The air flow measuring device of claim 11, wherein the circuitry includes an analog circuit.

15. The air flow measuring device of claim 11, wherein the circuitry includes a digital circuit.

16. The air flow measuring device of claim 15, wherein the digital circuit further comprises any combination of discrete logic and/or microprocessor executing software.

17. The air flow measuring device of claim 11, wherein the appliance further comprises a heat source and a controller that interprets the differential pressure measured by the air flow measuring device so as to determine air flow rate within the air flow passageway and at least one of permits or restricts operation of the heat source based on whether the air flow rate is above or below a prescribed threshold.

* * * * *